Nov. 4, 1969          L. O. HEWKO          3,475,993
                FRICTION DRIVE TRANSMISSION
Filed Feb. 14, 1967                    3 Sheets-Sheet 1

INVENTOR.
Lubomyr O. Hewko
BY
Robert L. Spencer
ATTORNEY

Nov. 4, 1969     L. O. HEWKO     3,475,993

FRICTION DRIVE TRANSMISSION

Filed Feb. 14, 1967     3 Sheets-Sheet 3

INVENTOR.
Lubomyr O. Hewko
BY
Robert L. Spencer
ATTORNEY

United States Patent Office 3,475,993
Patented Nov. 4, 1969

3,475,993
FRICTION DRIVE TRANSMISSION
Lubomyr O. Hewko, Sandusky, Ohio, assignor to General Motors Corporation, Detroit, Mich., a corporation of Delaware
Filed Feb. 14, 1967, Ser. No. 616,097
Int. Cl. F16h 37/06, 13/06
U.S. Cl. 74—798                                   13 Claims

ABSTRACT OF THE DISCLOSURE

A compound planetary friction drive wherein the planet-sun and planet-ring contacts are constructed and arranged such that the torque-transmitting capacity of the planet-ring contact is equal to the torque-transmitting capacity of the planet-sun contact such that the torque load at which the condition of slip of the planet-ring contact occurs is the same as that at which slippage of the planet-sun contact occurs.

---

It has heretofore been proposed to provide compound planetary friction drives incorporating a cylindrical planet-ring contact and a cylindrical planet-sun contact to increase over-all reduction ratio of a simple planetary. In such drives, slippage of the planet-ring contact surfaces always occurs prior to slippage of the planet-sun contact surfaces and it is impossible to obtain the maximum possible torque transmitting capacity. By equalizing the planet-ring and planet-sun contact torque-transmitting capacity, lower torque loading forces may be used for a drive of given capacity with resultant increase of useful roller life. Common practice is to use torque loading greater than necessary at the sun planet contact in order to obtain adequate torque-transmitting capacity at the planet-ring contact, with the result that for any given planet-ring contact torque-transmitting capacity the planet-sun contacts are excessively loaded. My invention provides equal torque-transmitting capacity at the planet-ring and planet-sun contacts without overloading the planet-sun contact. This is accomplished by providing a sun member for contacting the planet wherein the contact surfaces of the sun and planet are disposed at a first angle α with respect to the axis of rotation of the sun and planet and by providing contact surfaces between the planet and ring disposed at a second wedge angle B with respect to the axis of rotation of the planet. By providing the additional angle B at the planet-ring contact, the contact normal load of the planet and ring is adjusted to match the torque-transmitting capacity of the planet-sun contact. This assures that the condition of slip between the planet-ring contact and planet-sun contact are equalized.

It is accordingly an object of this invention to provide an improved compound planetary friction drive of the type incorporating a stepped planet having contact surfaces for contacting a sun and a ring at different radii, respectively, from the axis of rotation of the planet wherein the torque-transmitting capacity at the planet-ring contact is equal to the torque-transmitting capacity at the planet-sun contact.

Another object of this invention is to provide an improved compound friction drive of the type described wherein the contact surfaces of the planet with the ring diverge and the ring contact surfaces of the ring converge to provide a wedge angle contact between the ring and planet.

A further object of this invention is to provide an improved stepped planet-friction drive incorporating automatic torque-responsive means for loading the rolling contact surfaces and constructed and arranged to provide equal torque-transmitting capacity at the planet-ring contact and planet-sun contact irrespective of the fact that the radius of the planet-sun contact from the axis of rotation of the planet is greater than the radius of the planet-ring contact from the axis of rotation of the planet.

An additional object of this invention is to provide in a planetary friction drive of the type described, planet support shafts freely radially movable in a planet carrier.

These and other objects of the invention will be more fully understood from the following description and claims taken in conjunction with the accompanying drawings, in which:

Figure 3:
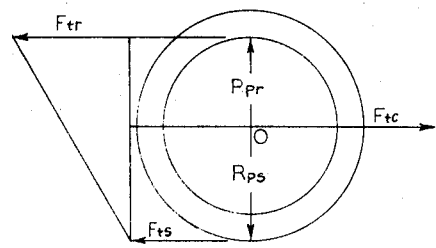
FIGURE 3 is a free body diagram of a conventional stepped planetary friction drive wherein the rolling contact surfaces of the planet and sun and planet and ring are cylindrical surfaces.
Figure 4:
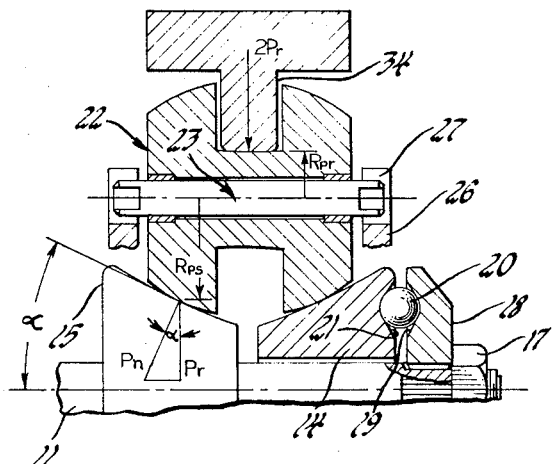
Figure 5:
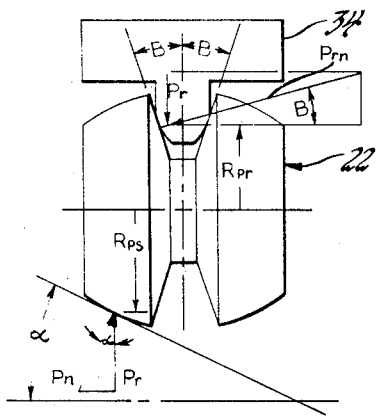

FIGURE 4 is a schematic diagram of a stepped friction drive wherein the contact surfaces of the planet and ring are cylindrical and the contact surfaces of the planet and sun are disposed at an angle α to the axis of rotation of the sun and the axis of rotation of the ring; and FIGURE 5 is a schematic diagram as shown in FIGURE 3 wherein the ring and planet contact is modified to provide a wedge angle B at the contact surface of the ring and planet.

Figure 1:
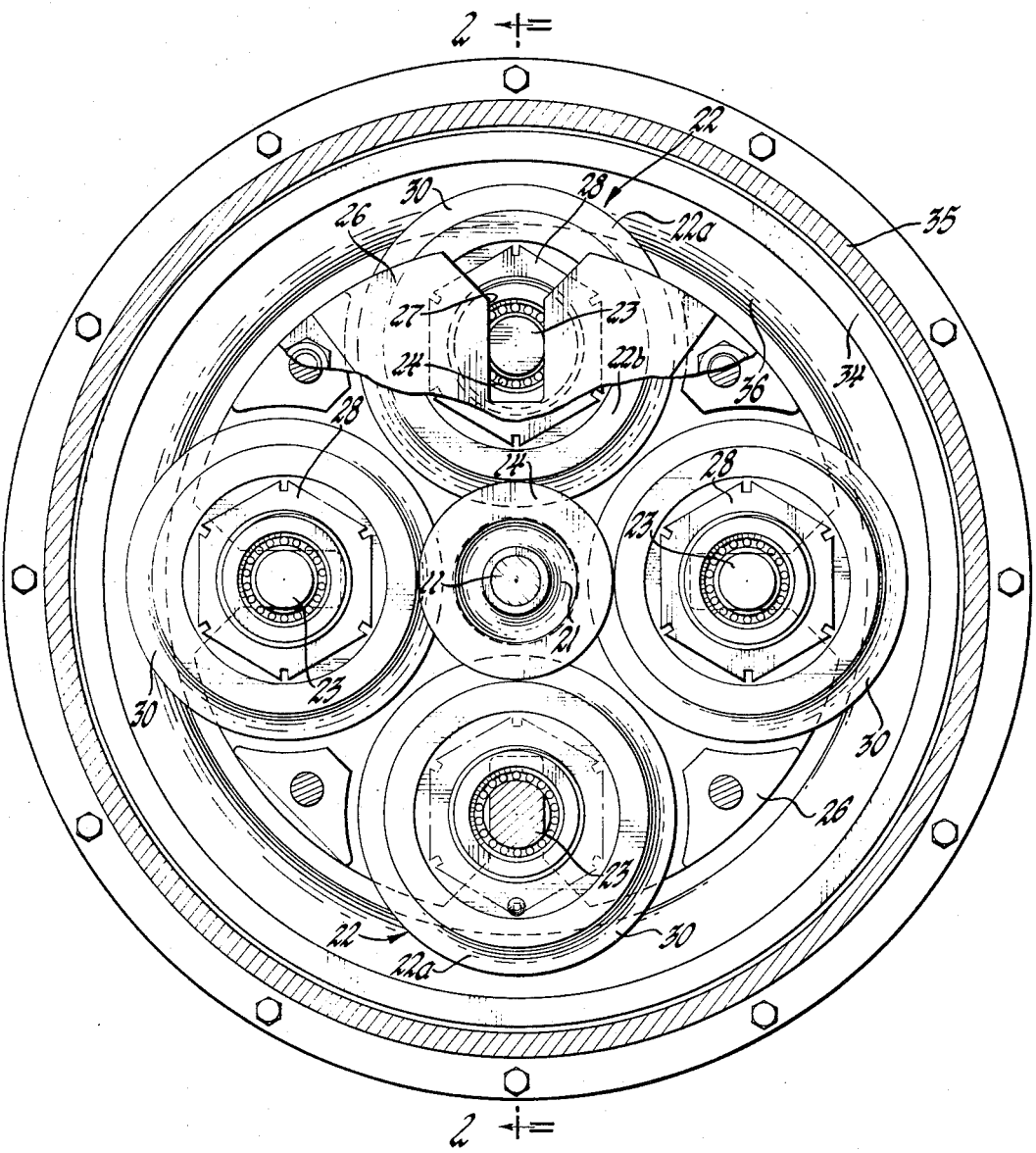
FIGURE 1 is an end view of a friction drive transmission constructed in accordance with the principles of this invention.
Figure 2:
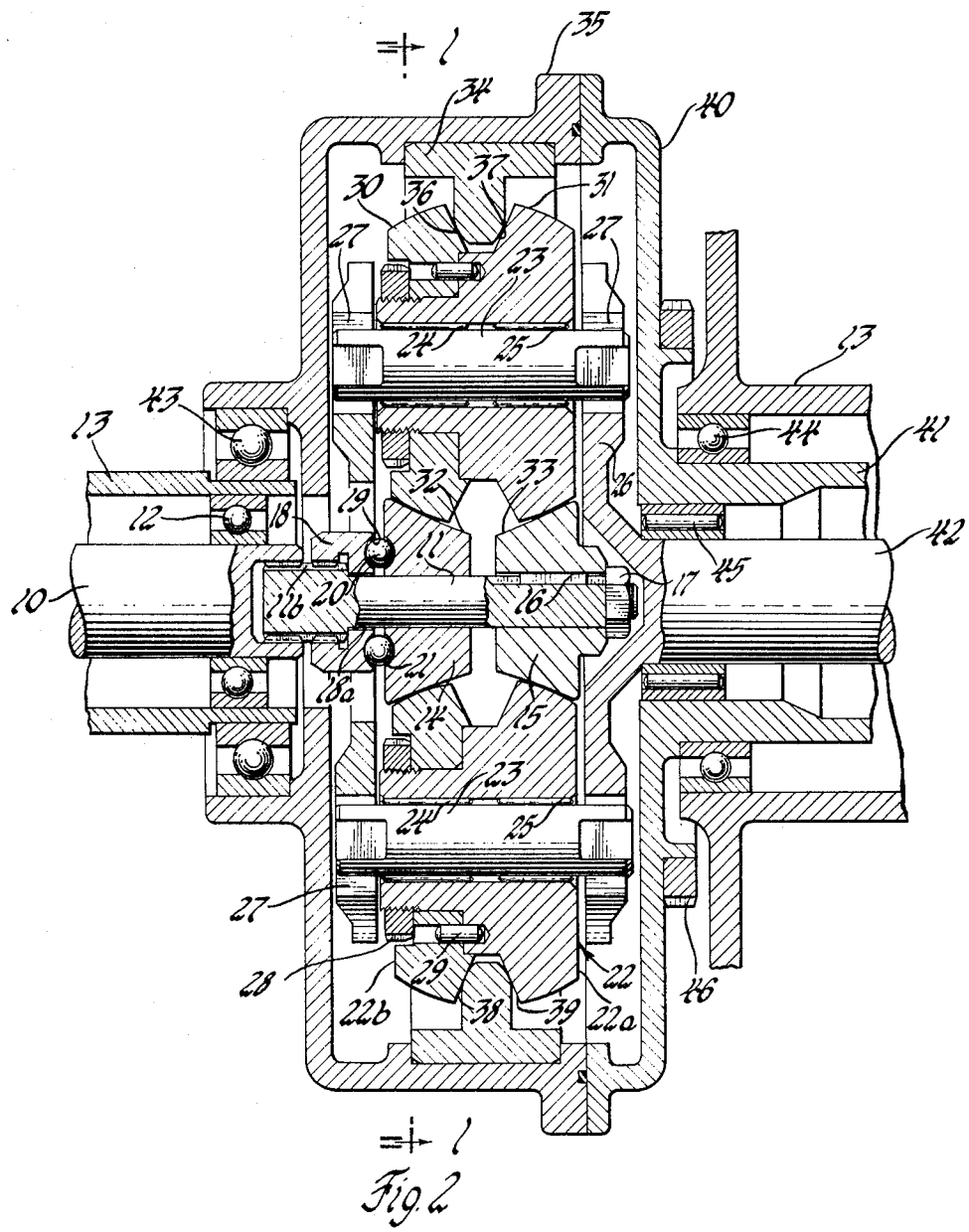
FIGURE 2 is a sectional view taken along the line 2—2 of FIGURE 1.

Referring to FIGURES 1 and 2 there is shown one embodiment of a compound planetary friction drive constructed in accordance with the principles of this invention. An engine driven power input shaft 10, splined to a sun power input shaft 11, is rotatably supported in a fixed housing 13 by a ball bearing 12. A first sun 14 is loosely supported upon shaft 11 for axial motion with respect to shaft 11 and a second sun 15 is splined or keyed to shaft 11 and driven through a key 16. A nut 17 retains sun 15 on shaft 11. Sun 14 is driven from shaft 11 through a torque loading device comprising a collar 18 splined to shaft 11 and a lip 18a extending radially inwardly past the ends of spline 11b on shaft 11. A ball ramp 19 on collar 18 is adapted to receive a ball 20. Ball 20 similarly extends into a ball ramp 21 formed on sun 14. It will be apparent that when shaft 11 is driven from shaft 10, ball 20 will act in ball ramps 19 and 21, to both rotate sun 14 and to apply an axial load to sun 14 tending to move sun 14 axially on shaft 11 and towards sun 15. The axial thrust applied to sun 14 will be proportional to the torque being transmitted. The torque sensitive device will permit the drive to operate at a relatively light preload when relatively low torque is being transmitted. Also, the torque loading structure will increase the load on the drive mechanism with increase in torque transmitted to prevent slipping of the rolling surface contacts. The torque loading device limits the radial loading of the contact rolling surfaces to an amount just sufficient to prevent slip at the contact surfaces and at the same time prevents excess surface loading of the contact rolling surfaces to provide long useful roller life. In addition, in the event of a momentary shock load or overload, the torque loading device automatically generates a momentary increase in the radial load on the rollers to prevent momentary slip of the rolling surfaces on each other. This is important in that it prevents permanent damage to the rolling contact surfaces due to shock loading or momentary overloading as would otherwise be caused due to momentary slippage of the rolling contact surfaces relative to each other. The torque loading structure not only increases dependability of the drive device but also greatly increases the fatigue durability of the rolling contacts and efficiency at part load or less than maximum load operation.

Planet pinion rollers indicated generally at 22 are rotatably supported on planet shafts 23 by needle bearings 24, 25. Shafts 23 are supported in a planet carrier 26, being fitted in carrier slots 27 such that shafts 23 and pinion rollers 22 are capable of free radial motion with respect to carrier 26. For ease of assembly of the complete power transmitting unit, planet roller pinions 22 are formed of an assembly of two rollers 22a and 22b retained in assembled relationship on pinion shaft 23 by a nut 28 screw-threaded upon roller section 22a and a dowel pin 29 which pins parts 22a and 22b to each other to prevent any relative rotation of these two parts relative to each other.

Contact surfaces 30, 31 of pinion 22 are in contact with contact surfaces 32, 33 of suns 14, 15, respectively. A ring 34 secured to a rotatable housing 35 for rotation therewith is provided with contact surfaces 36, 37 for making contact with contact surfaces 38, 39 respectively of the stepped planet 22, the contact surfaces 38 and 39 being tapered side surfaces of a recess or groove formed in the outer peripheral surface of the planet 22, as illustrated in FIGURE 2. An end cover 40 fixed for rotation with housing 35 terminates in an output sleeve shaft 41 and planet carrier drives a second output shaft 42 extending through output shaft 41. Housing 35 and cover 40 are rotatably supported in fixed housing 13 by ball bearings 43, 44, respectively. A needle bearing 45 is disposed between shafts 41, 42.

In the embodiment shown it is contemplated that shafts 41 and 42 will drive contra-rotating propellers (not shown) as are commonly employed in torpedo drives. However, in the event that the drive is to be employed in connection with a single output, housing 35 might be held against rotation by any suitable stop member, for example pawl (not shown) adapted to contact a gear 46 fixed to cover 40.

Referring to FIGURE 3 there is shown a free body diagram of a stepped planet in equilibrium, an illustration of the force vectors at the sun, ring and carrier. The expression $R_{pr}$ represents the planet radius at the planet-ring contact. $R_{ps}$ represents the planet radius at the planet-sun contact. It will be noted that the rolling radius $R_{ps}$ at the planet-sun contact is greater than the rolling radius $R_{pr}$ at the planet-ring contact. $F_{tr}$ represents the tractive force at the ring-planet contact. $F_{ts}$ represents the tractive force at the sun-planet contact, and $F_{tc}$ represents the carrier reaction force necessary to maintain equilibrium about point O.

In a compound stepped planetary friction drive employing cylindrical contact rolling surfaces for maximum reduction ratio the rolling radius at the planet-ring contact is always smaller than the rolling radius at the planet-sun contact. Therefore, for essentially equal normal load at all contacts, the ring contact with the planet will always tend to slip and will in fact slip before slip occurs at the planet-sun contact. My invention corrects this deficiency of compound stepped planet pinion drives incorporating cylindrical rolling contact surfaces and provides an improved structure whereby, for any given planet-sun contact loading, the normal load at the planet-ring contact is increased so as to compensate for the smaller planet radius, thereby matching the torque capacity at the planet-ring contact to the torque-transmitting capacity at the planet-sun contact.

In FIGURE 4 there is shown schematically a planetary drive structure wherein the planet roller 22 has a stepped diameter with the larger diameter rolling on the sun 14 and the smaller diameter comprising a cylinder rolling on a cylindrical ring 34, the ring 34 rolling on the smallest diameter of the planet 22. The contact surfaces of the sun and the large radius planet contact surfaces of planet 22 contact each other at an angle $\alpha$ with respect to the axis of rotation of the sun 14. With such a structure, the axial loading applied to the sun is divided into two components $P_n$ and $P_r$ wherein $P_n$ represents the normal load at the sun contact and $P_r$ represents the radial load at the sun contact with the planet. For a given angle $\alpha$ at the sun-planet contact, the radial load at the ring-planet contact is a function of the normal load at the planet-sun contact and the cosine of the angle $\alpha$ as set forth in the expression:

$$P_r = P_n \cos \alpha \tag{1}$$

FIGURE 5 represents a schematic diagram of the structure shown in FIGURES 1 and 2 wherein the planet-sun contact is still at the angle $\alpha$ as in FIGURE 4, but with the planet-ring contact modified as in FIGURE 2 to provide a wedge angle B between the contact surfaces of the planet and ring rather than a cylindrical contact as illustrated in FIGURE 4.

With the arrangement as shown in FIGURES 2 and 5, the load applied to the planet 22 is divided into two components $P_r$ and $P_{rn}$ wherein the above-mentioned $P_r$, the radial load at the sun contact with the planet, is also the effective radial load at the ring-planet contact and $P_{rn}$ is the effective normal load at the ring-planet contact. The relationship of these loads is expressed by the expressions:

$$P_{rn} = \frac{P_r}{\sin B}$$

or $$P_{rn} = \frac{P_n \cos \alpha}{\sin B} \tag{2}$$

For a wedge type planet and ring structure as shown in FIGURES 2 and 5, the sum of the torques about the planet center line equals zero.

From FIGURE 3, the tractive force multiplied by the radius from the centerline of the planet (center of rotation of the planet) equals the tractive force at the sun-planet contact multiplied by the radius of the planet to its contact with the sun, or:

$$F_{tr} \times R_{pr} = F_{ts} \times R_{ps} \tag{3}$$

wherein $F_{rt}$ represents the tractive force at the planet-ring contact
$R_{pr}$ represents the radius of the planet at the planet-ring contact
$F_{ts}$ represents the tractive force at the planet-sun contact
$R_{ps}$ represents the radius of the planet at the planet-sun contact but from FIGURE 5:

$$F_{ts} = 2P_n \times f_{ts}$$
$$F_{tr} = 2P_{rn} \times f_{tr} \tag{4}$$

Wherein:

$F_{ts}$ = the tractive force at the planet-sun contact
$P_n$ = the normal load at the planet-sun contact
$P_{rn}$ = the normal load at the planet-ring contact
$f_{ts}$ = the planet-sun traction coefficient
$F_{tr}$ = the tractive force at the planet-ring contact
$f_{tr}$ = the planet-ring traction coefficient Substituting Equations 2 and 4 into Equation 3 yields:

$$2 \times f_{tr} \times \frac{P_n \cos \alpha}{\sin B} \times R_{pr} = 2 \times f_{ts} P_n \times R_{ps}$$

or:

$$R_{pr} \times \cos \alpha \times f_{tr} = R_{ps} \times \sin B \times f_{ts}$$

The expression for angle B for equal torque transmitting capacity at the planet-sun and planet-ring contacts is then calculated as:

$$B = \arcsin\left(\frac{R_{pr}}{R_{ps}} \times \frac{f_{tr}}{f_{ts}} \cos \alpha\right) \tag{5}$$

It will be apparent that for every angle $\alpha$ between the planet-sun contact surfaces and the axis of rotation of the sun there is a wedge angle B between the planet-ring contacts which provides equal torque-transmitting capacity between the planet and sun and planet and ring.

The relationship between α and B for equal torque-transmitting capacity at the planet sun-planet and ring-planet contact is dictated by the coefficients of traction and the ratio of the two radii of the stepped planet and is determined by the Expression 5 above. By adding the additional wedge angle B to provide a tapered contact between the planet and ring, the contact normal load at the ring is adjusted to match the torque-transmitting capacity of the ring-planet contact to that of the sun-planet contact irrespective of the fact that the rolling radius of the stepped planet is smaller at the ring contact then it is at the sun contact.

This provides a compound stepped planetary friction drive wherein the plant-ring contact will not slip prior to slippage at the planet-sun contact and wherein the torque transmitting capacity of the planet-ring and planet-sun contacts are balanced irrespective of the fact that the rolling radius of the planet-sun contact is always greater than the rolling radius of the planet-ring contact.

As heretofore stated, the design of FIGURE 2 is specifically constructed to provide two contra-rotating outputs 41 and 42. However, in the event that a single output is desired, housing 35 and cover 40 may be fixed against rotation with the input shaft 10 and the output through carrier 26 and shaft 42. The design of FIGURE 2 is specifically useful, for example in torpedo drives which utilized two contra-rotating propellers. However, it will readily be understood that the drive may be used for other purposes and may be used as a single output drive if desired.

What is claimed is:

1. A compound planetary friction drive comprising a planet carrier, a shaped planet pinion supported for rotation in said carrier, said pinion having a tapered groove formed around the outer periphery thereof, a wedge-shaped ring contacting the sides of said tapered groove of said planet pinion forming wedge angle contact means at a wedge angle and at a first radius from the axis of rotation of said pinion, arcuate-shaped suns contacting the shaped surfaces of said pinion adjacent the edges of said tapered groove at a predetermined angle with the pinion axis and at a second radius from the axis of rotation of said pinion and greater than said first-mentioned radius, said wedge angle contact means of contact between said ring and pinion providing torque-transmitting capacity at the ring-planet contact equal to the torque-transmitting capacity at the angled pinion-sun contact irrespective of the difference in the radii of the ring and sun contacts with said pinion.

2. A compound planetary friction drive comprising a planet carrier, a planet pinion rotatably supported in said carrier, a ring, converging side walls on said ring, diverging side walls on a recessed central portion of said pinion in contact with said converging walls of said ring, respectively, at a first radius with respect to the aixs of rotation of said pinion and providing wedge angle contact means between said ring and said recessed central portion of said pinion, angled suns contacting the outer portions of said pinion adjacent the edges of said recessed central portion forming pinion-sun contact means at a predetermined angle with the pinion axis and at a radius with respect to the axis of rotation of said pinion greater than said first-mentioned radius, said wedge angle contact means between said pinion and ring providing torque-transmitting capacity at the pinion-ring contact equal to the torque-transmitting capacity at the angled pinion-sun contact means irrespective of the difference in radii of the contact of said pinion with said ring and said suns.

3. A compound planetary friction drive comprising a planet carrier, a planet pinion supported for rotation in said carrier, a ring, diverging walls on a central circumferential recess on said pinion for receiving said ring, converging walls on said ring contacting said walls of said recess at a wedge angle, a sun, a contact surface on said sun disposed at an angle to the axis of rotation of said sun and contacting said pinion on the surfaces radially outwardly adjacent said recess, torque-responsive means for applying a radial load to the contact surface of said sun and planet pinion, said wedge angle contact at said ring-planet contact being effective to equalize the torque-transmitting capacity of the contact of said planet with said ring to the torque-transmitting capacity of said planet pinion with said sun.

4. A compound planetary friction drive comprising a planet carrier, a support shaft supported in said carrier for free radial movement with respect to said carrier, a stepped planet pinion rotatably supported upon said shaft, a sun, a ring, an internal flange formed on said ring, a contact surface on the sloped walls of a groove formed around the periphery of said pinion in contact with said internal flange at a first radius with respect to the axis of rotation of said pinion about said shaft, a second contact surface on the outer portion of said pinion adjacent said sloped walls in contact with said sun at a second radius with respect to the axis of rotation of said pinion about said shaft, the contact surfaces of said ring and pinion being disposed at an angle to the plane of rotation of said pinion whereby the torque-transmitting capacity of the pinion-sun contact is equal to the torque-transmitting capacity of the pinion-ring contact irrespective of the difference of the radii of contact of said pinion with said sun and ring, and torque-responsive means for applying a radial thrust to said pinion.

5. A compound planetary friction drive comprising a planet carrier, a support shaft supported in said carrier for free radial movement with respect to said carrier, a planet pinion rotatably supported upon said support shaft, an arcuate contact surface on said planet pinion, a sun in contact with said arcuate contact surface, torque-responsive means for applying a radial thrust to said planet pinion, spaced contact surfaces formed on the side surfaces of a groove on said planet pinion adapted to contact a ring, spaced inwardly converging contact surfaces on said ring in contact with said side surfaces of said groove, the radius of rotation of said planet pinion contact surface with said sun being greater than the radius of rotation of said planet pinion contact surface with said ring, said ring contact surface contacting said pinion contact surface at a wedge angle whereby the torque-transmitting capacity at the ring-planet contact is equal to that of the planet-sun contact irrespective of the difference in radius of rotation of the pinion-sun contact surface and pinion-ring contact surface with respect to the axis of rotation of said pinion.

6. A compound planetary friction drive comprising a planet carrier, a planet pinion supported for rotation in said carrier, a ring having inwardly converging surfaces thereon, a sun, a contact surface on a hollow portion in the outer peripheral surface of said pinion for contacting said inwardly converging surfaces of said ring at a first rolling radius with respect to the axis of rotation of said pinion, a second contact surface on sloped portions of said pinion radially beyond said hollow portion, said sloped portions sloping downwardly from the outer edges of said hollow portion for contacting said sun at a second rolling radius with respect to the axis of rotation of said pinion, said second rolling radius being greater than said first rolling radius, said pinion contacting said ring at an angle to the plane of rotation of said pinion whereby the torque-transmitting capacity of the planet-ring contact is made equal to the torque-transmitting capacity of said planet-sun contact irrespective of the difference of the rolling radius of the pinion with said sun and the rolling radius of the pinion with said ring.

7. A compound planetary friction drive comprising a power input shaft, a sun formed of two sun members driven by said power input shaft, one of said sun members being axially movable on said input shaft, a planet carrier, a planet shaft supported in said carrier for radial movement with respect to said carrier, a stepped planet pinion supported for rotation on said planet shaft, a ring, contact surfaces one each of said sun members, contact surfaces on a first step of said planet pinion in contact with the contact surfaces of said sun members, respectively, and at a first rolling radius with respect to the axis of rotation of said pinion, said sun contact surfaces contacting said pinion contact surfaces at a first angle with respect to the axis of rotation of said sun members, torque-responsive means for biasing said movable sun member in a direction toward said second sun member in response to increase of torque being transmitted, contact surfaces on a recessed step of said pinion sloping inwardly from the outer edges of said recessed step and at a second rolling radius with respect to the axis of rotation of said pinion, said first-mentioned rolling radius being greater than said second rolling radius, and contact surfaces on the edges of the outer faces and inner surface of said ring in contact with the contact surfaces, respectively, formed on said recessed step of said pinion, said ring and pinion contact surfaces being disposed at an angle with respect to the plane of rotation of said pinion to form a wedge contact between said pinion and ring contact surfaces whereby the torque-transmitting capacity between said ring and pinion contact surfaces is made equal to the torque-transmitting capacity between the sun and pinion contact surfaces irrespective of the difference in rolling radii of the pinion contact with the sun and the ring.

8. A planetary friction drive as set forth in claim 7 wherein the relationship between the angle of the planet-sun contact surface and the angle of the planet-ring contact surface is represented by the expression:

$$B = \text{arc } \sin\left(\frac{R_{pr}}{R_{ps}} \times \frac{f_{tr}}{f_{ts}} \cos \alpha\right)$$

in which:

B represents the angle of the ring contact surface with the pinion contact surface $R_{pr}$ represents the planet radius at the planet-ring contact $R_{ps}$ represents the planet radius at the planet-sun contact $f_{tr}$ represents the planet-ring traction coefficient $f_{ts}$ represents the planet-sun traction coefficient $\alpha$ represents the angle of the planet contact surface with the sun contact surface.

9. A planetary friction drive comprising a planet pinion carrier, a friction planet pinion rotatably supported in said carrier for rotation about a pinion axis and having annular ring contact friction surface means at one radius from the pinion axis and annular sun contact friction surface means at another different radius from the pinion axis, a friction ring having annular friction surface contact means in friction contact with said annular ring contact friction surface means at said one pinion radius providing a ring-pinion contact, a friction sun rotatable about a sun axis having annular friction surface contact means in friction contact with said annular sun contact friction surface means of said pinion at said another radius providing a sun-pinion contact, preloading means operatively connected to said friction ring and friction sun for applying equal radial loading at said ring-pinion contact and said sun-pinion contact, said annular ring contact friction surface means of said pinion contacting said annular friction surface contact means of said ring at said one radius of said pinion and having an acute angle with respect to a line normal to said sun axis and at said one radius from the pinion axis, and said annular sun contact friction surface means of said pinion contacting said annular contact means of said sun at said another radius of said pinion and having an acute angle with respect to said sun axis, said radii and said angles being such that the product of said one radius times the sine of said acute angle at said ring-pinion contact with respect to a line normal to said sun axis is substantially equal to the product of said another radius times the cosine of said acute angle at said sun-pinion contact with respect to said sun axis.

10. The invention defined in claim 9 and said products as modified by the coefficients of friction of said sun-pinion contact and of said ring-pinion contact being essentially equal.

11. The invention defined in claim 9 and at least one of said ring-pinion and sun-pinion contact surfaces being conical.

12. The invention defined in claim 9 and both of said ring-pinion and sun-pinion contact surfaces being conical.

13. A planetary friction drive comprising a planet pinion carrier, a friction planet pinion rotatably supported in said carrier for rotation about a pinion axis and having annular ring contact friction surface means at one radius from the pinion axis and annular sun contact friction surface means at another different radius from the pinion axis, a friction ring having annular friction surface contact means in friction contact with said annular ring contact friction surface means at said one pinion radius providing a ring-pinion contact, a friction sun having annular friction surface contact means in friction contact with said annular sun contact friction surface means of said pinion providing a sun-pinion contact, preloading means operatively connected to said friction ring and friction sun for applying substantially equal radial loading at said ring-pinion contact and said sun-pinion contact, said preloading means and said carrier including planet pinion support means supported in said carrier for supporting said planet pinion for free radial movement of said planet pinion while maintaining the direction of said pinion axis to permit substantially equalizing said radial loading, said annular ring contact friction surface means of said pinion contacting said annular friction contact surface means of said ring at one radius of said pinion and having an angle less than 90° and greater than 0° with respect to said pinion axis and at said one radius from the pinion axis for providing a predetermined torque-transmitting capacity and said annular sun contact friction surface means of said pinion contacting said annular contact means of said sun at said another radius of said pinion and having another and different angle less than 90° with respect to said pinion axis for providing torque-transmitting capacity at the sun-pinion contact substantially equal to said predetermined torque-transmitting capacity of said ring-pinion contact.

References Cited

UNITED STATES PATENTS

| 1,709,345 | 4/1929 | Garrard | 74—208 X |
| 1,718,846 | 6/1929 | Arter | 74—208 X |
| 2,939,345 | 6/1960 | Burns | 74—798 XR |
| 3,216,285 | 11/1965 | Nasvytis | 74—798 |
| 3,283,614 | 11/1966 | Hewko | 74—798 |

FOREIGN PATENTS

| 490,933 | 4/1926 | Germany. |
| 218,170 | 3/1942 | Switzerland. |

DONLEY J. STOCKING, Primary Examiner

THOMAS C. PERRY, Assistant Examiner

U.S. Cl. X.R.

74—208, 665